July 26, 1955
J. V. LONGAN
2,713,867
MEAT CHOPPER PLATE CLEANER
Filed Jan. 13, 1953
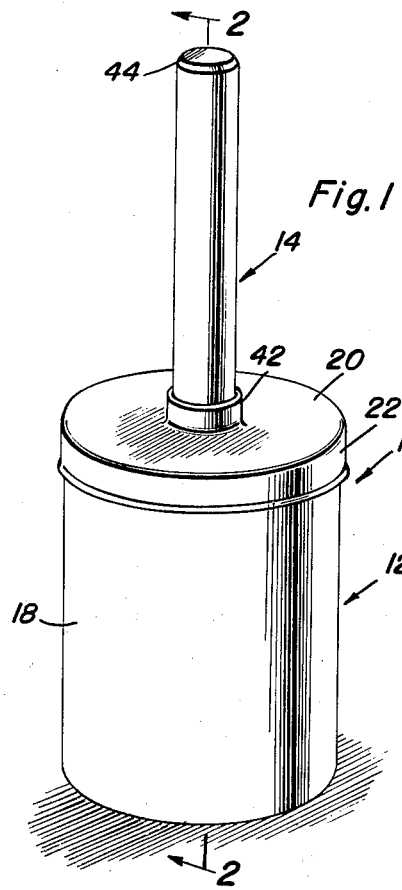
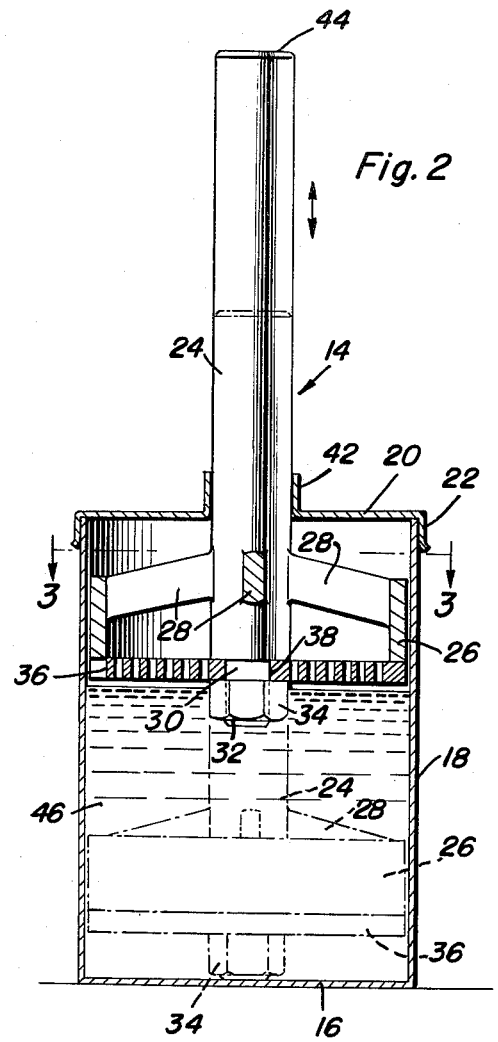
John V. Longan
INVENTOR.
BY *Clarence A. O'Brien*
*and Harvey B. Jackson*
Attorneys

United States Patent Office 2,713,867
Patented July 26, 1955

2,713,867

MEAT CHOPPER PLATE CLEANER

John V. Longan, Archer City, Tex.

Application January 13, 1953, Serial No. 331,052

1 Claim. (Cl. 134—137)

This invention relates in general to meat choppers, and more specifically to a cleaner for meat chopper plates.

Conventional meat choppers are provided with extrusions or chopper plates in the form of flat discs having a plurality of apertures therethrough. In a grinding operation meat or other materials being ground are extruded through these apertures. Inasmuch as meat chopper plates must be kept in a clean and a sterilized condition, it is necessary to repeatedly clean such plates after each use. Due to the fact that there are numerous apertures in a meat chopper plate and meat or other materials have a tendency to stick in these apertures the cleaning of such a plate is normally a time consuming job. Therefore, it is the primary object of this invention to provide an improved meat chopper plate cleaner with which the cleaning of a meat chopper plate becomes a simple and quick operation.

Another object of this invention is to provide an improved meat chopper plate cleaner which includes a container for fluids through which a meat chopper plate is intended to be moved for cleaning purposes, the meat chopper plate cleaner also including support means for a meat chopper plate whereby the same may be moved through fluids in the container at a rapid rate so as to force the fluid through the apertures in the meat chopper plate at a high speed under pressure to thoroughly clean the apertures in the meat chopper plate.

Another object of this invention is to provide an improved meat chopper plate cleaner which is of a relatively simple construction and formed of readily obtainable materials so as to be economically feasible.

A further object of this invention is to provide an improved support for a meat chopper plate which may be utilized in combination with a fluid container for cleaning a meat chopper plate, said support including a shaft adapted to be driven by a hammer or the like to forceably urge a meat chopper plate through fluid trapped within a container so as to force the fluid through apertures in a meat chopper plate in order to clean the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the improved meat chopper plate cleaner which is the subject of this invention and shows the general outline of the same;

Figure 2 is an enlarged vertical sectional view taken substantially upon the plane indicated by the section line 2—2 of Figure 1 and shows the specific construction of the meat chopper plate cleaner, a support for a meat chopper plate being in upper position prior to a downward cleaning stroke, the position of the support at the lower end of the cleaning stroke being shown in dotted lines; and, Figure 3 is a transverse horizontal sectional view taken substantially upon the plane indicated by the section line 3—3 of Figure 2 and shows the relationship of the meat chopper plate support relative to the meat chopper plate.

The meat chopper plate cleaner, which is the subject of this invention, is referred to in general by the reference numeral 10. The meat chopper plate cleaner 10 includes a container which is referred to in general by the reference numeral 12 and a meat chopper plate support which is referred to in general by the reference numeral 14. The container 12 is formed of relatively rigid material and includes a bottom 16 and a vertically extending cylindrical body portion 18. The container 12 also includes a removable cover 20 which has a downwardly projecting peripheral flange 22 which telescopes over the upper end of the cylindrical body 18 in sealed relation therewith.

The meat chopper plate support 14 includes an elongated shaft 24 which has disposed adjacent the lower end thereof a concentric cylindrical guide portion 26. The guide portion 26 is supported relative to the shaft 24 by radial ribs 28 extending between upper portions of the cylindrical guide portion 26 and intermediate portions of the shaft 24.

Disposed in a common plane with the lower edge of the cylindrical guide portion 26 is an intersection between the lower end of the shaft 24 and an integral reduced stem portion 30. The lower part of the stem portion 30 is provided with external threads 32 on which a nut 34 is adjustably threaded.

Mounted on the stem portion 30 of the shaft 24 is a conventional meat chopper plate which is referred to by the reference numeral 36. The meat chopper plate 36 is in the form of a circular disc having a central mounting aperture 38 therethrough in which is disposed the stem portion 30. The meat chopper plate 36 also includes a plurality of relatively small apertures 40 through which meat or other materials are extruded when in use on a meat chopper. It is these apertures 40 which must be thoroughly cleaned in order to provide a sanitary condition.

It will be noted that when the meat chopper plate 36 is disposed on the stem portion 30 of the shaft 24, the central portion thereof abuts against the lower end of the main portion of the shaft 24 and the outer portion thereof abuts against the lower edge of the cylindrical guide portion 26. The meat chopper plate 36 is retained in this position by the nut 34 bearing against the central portion of the lower face thereof and clamping the same against the lower end of the main portion of the shaft 24 and the lower edge of the cylindrical guide portion 26.

It will be noted that the cover 20 is provided with an upwardly projecting integral cylindrical sleeve 42 through which passes the shaft 24. Also, it will be noted that the upper end of the shaft 24 is provided with a hammer engageable surface 44.

Due to the relationship of the shaft 24 to the sleeve 42 and the guide portion 26 to the inner surface of the cylindrical body portion 18 of the container, it will be seen that the meat chopper plate support 14 will be guided for vertical movement only. When the meat chopper plate support 14 has a meat chopper plate 36 mounted thereon and disposed in the uppermost position overlying a liquid 46 disposed in the container 12, the meat chopper plate 36 is in position for a cleaning operation. The upper end of the shaft 44 is then struck a swift blow by a hammer or the like (not shown) which forceably urges the meat chopper plate 36 downwardly through the liquid 46 at a high rate of speed. This results in the liquid 46 passing upwardly through the apertures 40 under force at a relatively great pressure and high rate of speed so as to thoroughly clean the apertures 40.

It is to be understood that if properly used the meat chopper plate cleaner 10 will clean a meat chopper plate, such as plate 36, in a single operation. However, if it is deemed necessary, the operation may be repeated one or more times. It will also be understood that the liquid 46 may be any suitable cleaning compound now being utilized in the washing of meat chopper plates.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A meat chopper plate cleaner comprising a container adapted to contain a relatively incompressible cleaning fluid, a meat chopper plate support guidingly carried by said container, said support including means for removably securing a meat chopper plate thereto, said container having a removable cover, said support including a shaft slidably journaled in said cover, a guide carried by a lower end of said shaft for engaging walls of said container, said guide forming a seat for a meat chopper plate, said guide being cylindrical and disposed concentric with said shaft, ribs integral with said guide and said shaft and securing said guide to said shaft.

References Cited in the file of this patent

UNITED STATES PATENTS

| | | |
|---|---|---|
| 1,425,238 | Cole | Aug. 8, 1922 |
| 1,820,718 | Willems | Aug. 25, 1931 |
| 1,998,692 | Van Rossem | Apr. 23, 1935 |
| 2,156,594 | Lester | May 2, 1939 |

FOREIGN PATENTS

| | | |
|---|---|---|
| 340,370 | Italy | May 12, 1936 |
| 567,012 | Germany | Dec. 27, 1932 |